(12) United States Patent
Kang et al.

(10) Patent No.: US 12,065,102 B2
(45) Date of Patent: Aug. 20, 2024

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Seungkyu Kang, Hwaseong-si (KR); Heongseok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 98 days.

(21) Appl. No.: 17/989,452

(22) Filed: Nov. 17, 2022

(65) Prior Publication Data
US 2023/0174020 A1 Jun. 8, 2023

(30) Foreign Application Priority Data
Dec. 7, 2021 (KR) .................. 10-2021-0174167

(51) Int. Cl.
B60R 25/01 (2013.01)
B60N 2/02 (2006.01)
B60R 25/30 (2013.01)
B60R 25/31 (2013.01)
B62D 1/181 (2006.01)
G06T 7/60 (2017.01)

(52) U.S. Cl.
CPC .......... *B60R 25/305* (2013.01); *B60N 2/0244* (2013.01); *B60R 25/01* (2013.01); *B60R 25/31* (2013.01); *B62D 1/181* (2013.01); *G06T 7/60* (2013.01); *G06T 2207/30196* (2013.01); *G06T 2207/30252* (2013.01)

(58) Field of Classification Search
CPC ...... B60W 30/08; B60W 10/20; B60W 10/30; B60W 40/04; B60W 40/08; B60W 50/14; B60W 2040/0818; B60W 2050/143; B60W 2050/146; B60W 2540/30; B60W 2554/00; B60W 2556/10; B60W 2710/0605; B60W 2710/182; B60W 2710/202
See application file for complete search history.

(56) References Cited

U.S. PATENT DOCUMENTS

2017/0108862 A1* 4/2017 Mikkelsen ............. B60K 28/06

* cited by examiner

Primary Examiner — Jacob M Amick
Assistant Examiner — Charles J Brauch
(74) Attorney, Agent, or Firm — Lempia Summerfield Katz LLC

(57) ABSTRACT

A vehicle includes: a camera disposed on left and right sides of an exterior of the vehicle and configured to acquire image data by photographing a surrounding area of the vehicle. A controller is configured to, upon a touch of a user on a door handle of a driver door being identified based on image processing on the image data, determine a height of the user based on the image processing on the image data and to adjust positions of a driver's seat, a steering wheel, and a head up display (HUD) to correspond to the determined height of the user.

18 Claims, 11 Drawing Sheets

FIG. 6

| DETERMINED HEIGHT OF USER | OPTIMAL POSITION INFORMATION OF DRIVER'S SEAT FOR EACH HEIGHT | | |
|---|---|---|---|
| | HEIGHT | POSITION OF DRIVER'S SEAT | POSITION OF STEERING WHEEL | POSITION OF HUD |
| | ... | | | |
| | 150~152 | FORWARD CONTROL | FORWARD CONTROL | DOWNWARD CONTROL |
| | ... | | | |
| xxx mm | 175~177 | REFERENCE POSITION | REFERENCE POSITION | REFERENCE POSITION |
| | ... | | | |
| | 187~189 | BACKWARD CONTROL | BACKWARD CONTROL | UPWARD CONTROL |
| | ... | | | |

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2021-0174167, filed on Dec. 7, 2021 in the Korean Intellectual Property Office, the disclosure of which is incorporated herein by reference.

BACKGROUND

1. Technical Field

The disclosure relates to a vehicle capable of optimizing the position of a driver's seat and a method of controlling the same.

2. Description of the Related Art

The position of a driver's seat is a factor that affects the driver's convenience and is a factor in potential injury to a driver in an accident. However, in the current state of technology, the position of a driver's seat is adjusted only based on a driver's input, thus decreasing the convenience of a driver.

For example, the driver may directly adjust the driver's seat position using an input device or may be given a recommended driver's seat position by inputting his or her body information. As such, the driver is inconvenienced due to a need to manipulate an input device or input body information.

In addition, a seat provided with a seat sensor to correct the driver's seated posture while driving also has difficulty in recognizing the driver's body information before the driver boards the vehicle.

SUMMARY

Therefore, it is an object of the disclosure to provide a vehicle capable of acquiring, before the driver boards the vehicle, body information of a driver through a camera of a camera monitoring system (CMS). It is another object of the disclosure to provide a vehicle capable of adjusting the positions of a driver's seat, a steering wheel, and a head up display (HUD) to correspond to the driver's body information. It is another object of the disclosure to provide a method of controlling the same.

The technical objectives of the disclosure are not limited to the above. Other objectives may become apparent to those having ordinary skill in the art based on the following descriptions.

According to an aspect of the disclosure, a vehicle is provided including a camera and a controller. The camera is disposed on left and right sides of an exterior of the vehicle and is configured to acquire image data by photographing a surrounding area of the vehicle. The controller is configured to, upon a touch of a user on a door handle of a driver door being identified based on image processing on the image data, determine a height of the user based on the image processing on the image data. The controller is configured to adjust positions of a driver's seat, a steering wheel, and a head up display (HUD) to correspond to the determined height of the user.

The controller may be configured to determine the height of the user upon the user being identified at a point higher than a predetermined child lock reference horizontal line in the image data. The controller may also be configured to keep a door locked upon the user not being identified at the point higher than the predetermined child lock reference horizontal line in the image data.

The controller may be configured to determine a region located at a highest position from a ground among regions in which the user is identified in the image data, and to determine the height of the user based on the determined region.

The controller may be configured to: determine a height dimension based on a horizontal line corresponding to the determined region among a plurality of horizontal lines dividing the image data vertically; determine a correction factor based on a vertical line corresponding to the determined region among a plurality of vertical lines dividing the image data horizontally; and determine the height of the user as a product of the height dimension and the correction factor.

The correction factor may decrease as the vertical line becomes more distant from a predetermined specific region in the image data sideways.

The controller may be configured to adjust the positions of the driver's seat, the steering wheel, and the HUD to optimal positions corresponding to the height of the user based on information about optimal positions of the driver's seat, the steering wheel, and the HUD for each height.

The controller may be configured to, upon a presence of a registered driver having the height of the user in a registered driver list, adjust the positions of the driver's seat, the steering wheel, and the HUD to positions designated by the registered driver.

The controller may be configured to maintain the positions of the driver's seat, the steering wheel, and the HUD upon an opening of the driver door not being detected for a predetermined time after the height of the user is determined.

The controller may be configured to determine a hip point of the user together with the height of the user based on the image processing on the image data and to adjust the positions of the driver's seat, the steering wheel, and the HUD to correspond to the height and the hip point.

According to another aspect of the disclosure, a method of controlling a vehicle is provided. The vehicle includes a camera disposed on left and right sides of an exterior of the vehicle and configured to acquire image data by photographing a surrounding area of the vehicle. The method includes, upon a touch of a user on a door handle of a driver door being identified based on image processing on the image data, determining a height of the user based on the image processing on the image data. The method also includes adjusting positions of a driver's seat, a steering wheel, and a head up display (HUD) to correspond to the determined height of the user.

The method may further include determining the height of a user upon the user being identified at a point higher than a predetermined child lock reference horizontal line in the image data. The method may also include keeping a door locked upon the user not being identified at the point higher than the predetermined child lock reference horizontal line in the image data.

The determining of the height of the user may include determining a region located at a highest position from a ground among regions in which the user is identified in the image data and may include determining the height of the user based on the determined region.

The determining of the height of the user may include: determining a height dimension based on a horizontal line corresponding to the determined region among a plurality of horizontal lines dividing the image data vertically; determining a correction factor based on a vertical line corresponding to the determined region among a plurality of vertical lines dividing the image data horizontally; and determining the height of the user as a product of the height dimension and the correction factor.

The correction factor may decrease as the vertical line becomes more distant from a predetermined specific region in the image data sideways.

The adjusting of the positions of the driver's seat, the steering wheel, and the HUD to correspond to the height of the user may include adjusting the positions of the driver's seat, the steering wheel, and the HUD to optimal positions corresponding to the height of the user based on information about optimal positions of the driver's seat, the steering wheel, and the HUD for each height.

The adjusting of the positions of the driver's seat, the steering wheel, and the HUD to correspond to the height of the user may include, upon a presence of a registered driver having the height of the user in a registered driver list, adjusting the positions of the driver's seat, the steering wheel, and the HUD to positions designated by the registered driver.

The adjusting of the positions of the driver's seat, the steering wheel, and the HUD to correspond to the height of the user may include maintaining the positions of the driver's seat, the steering wheel, and the HUD upon an opening of the driver door not being detected for a predetermined time after the height of the user is determined.

The adjusting of the positions of the driver's seat, the steering wheel, and the HUD to correspond to the height of the user may include: determining a hip point of the user together with the height of the user based on the image processing on the image data; and adjusting the positions of the driver's seat, the steering wheel, and the HUD to correspond to the height and the hip point

BRIEF DESCRIPTION OF THE DRAWINGS

These and/or other aspects of the disclosure should become apparent and more readily appreciated from the following description of the embodiments, taken in conjunction with the accompanying drawings of which:

FIG. 6 is a diagram illustrating that a vehicle adjusts the position of a driver's seat to correspond to the height of a user in the vehicle according to an embodiment;

DETAILED DESCRIPTION

Figure 1:
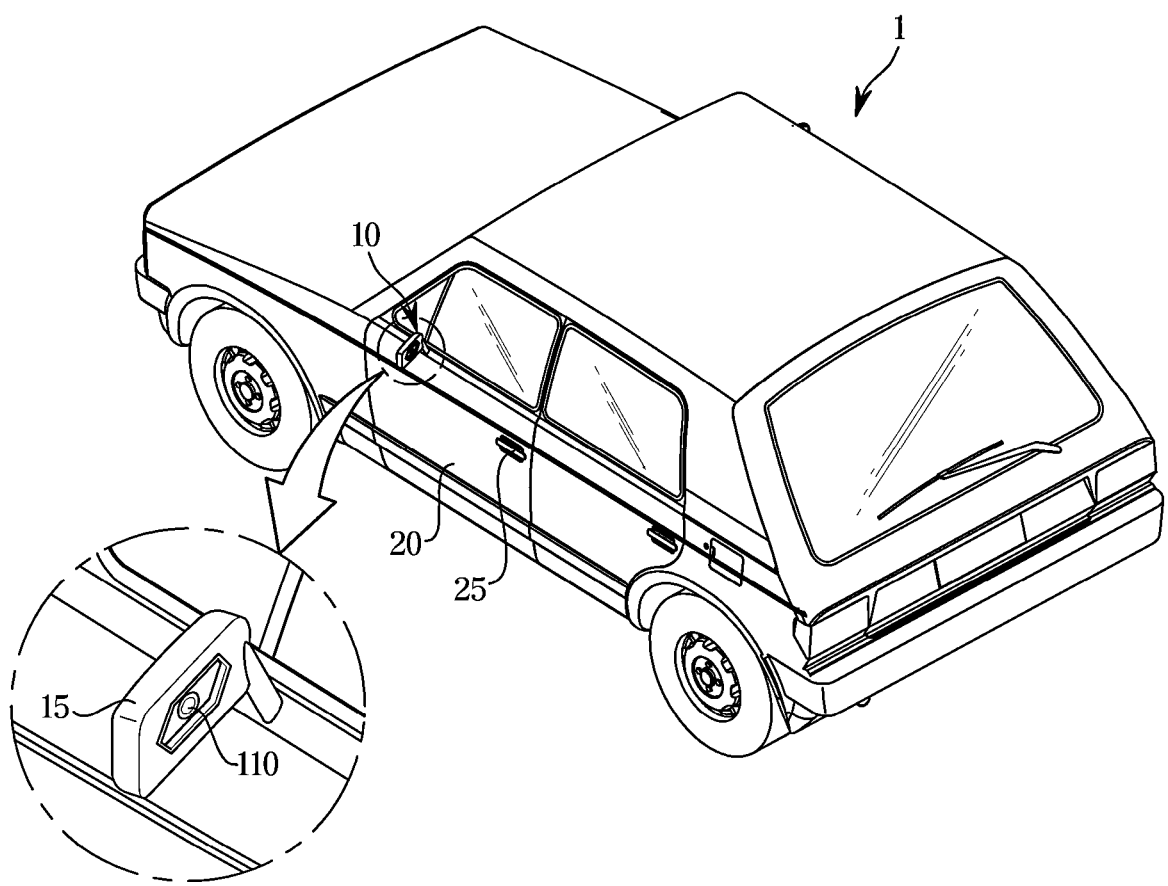
FIG. 1 is an external view of a vehicle according to an embodiment.

Like numerals refer to like elements throughout the specification. Not all elements of the embodiments of the present disclosure are described. Descriptions of aspects commonly known in the art or that overlap in the embodiments have been omitted.

In describing the embodiments according to the present disclosure, unless otherwise defined, all terms including technical and scientific terms used herein are to be interpreted as is customary in the art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

It should be further understood that the term "connect" or its derivatives refer both to direct and indirect connection, and the indirect connection includes a connection over a wireless communication network.

It should be further understood that the terms "have," "has," "having," "include," "includes," "including", "comprise," "comprises," and/or "comprising," when used in this specification, specify the presence of stated features, integers, steps, operations, elements, and/or components, but do not preclude the presence or addition of one or more other features, integers, steps, operations, elements, As used herein, the singular forms "a," "an," and "the" are intended to include the plural forms as well, unless the context clearly indicates otherwise. Further, "driver seat" and "driver's seat" may be used interchangeably throughout the disclosure.

The terms, such as "~ part," "~device," "~block," "~member," "~ module," and the like may refer to a unit for processing at least one function or act. For example, the terms may refer to at least process processed by at least one hardware, such as field-programmable gate array (FPGA)/application specific integrated circuit (ASIC), software stored in memories, or processors.

Reference numerals used for method steps are just used for the convenience of explanation, but not to limit the order of the steps. Thus, unless the context clearly dictates otherwise, the written order may be practiced otherwise.

Hereinafter, embodiments of a vehicle according to an aspect of the disclosure and a method of controlling the same are described in detail with reference to the accompanying drawings.

FIG. 1 is an external view of a vehicle according to an embodiment.

Referring to FIG. 1, a vehicle 1 according to the embodiment may include a camera monitoring system 10 that replaces a side mirror. The camera monitoring system 10 may include a housing 15 disposed on each of left and right sides of the vehicle 1 and a camera 110 provided in the housings 15 to photograph the sides and rear of the vehicle 1. Although not shown, the camera monitoring system 10 may include a display (not shown) provided inside the vehicle 1 for displaying an image captured by the camera 110. The cameras 110 and housing 15 may be described herein together as plural features or separately as singular features. However, the description of features of one camera 110 or one housing 15 may be equally applicable to any of the cameras or housings.

The camera monitoring system 10, including the cameras 110 disposed on the left and right sides of the outside of the vehicle 1 to obtain a surrounding image (e.g., a side and rear image) of the vehicle 1, and the display provided inside the vehicle 1 to display the captured images, may function as a side mirror. The camera monitoring system 10 may further provide a side and rear image without a blind spot so that the probability of an accident may be reduced.

In addition, the housing 15 of the camera monitoring system 10 may be folded or unfolded depending on the state of the vehicle 1, according to embodiments. In other words, the housing 15, in a parked state of the vehicle 1, may be folded by rotating in a direction that the camera 110 faces the inside of the vehicle 1. Further, in a travelling or driving state of the vehicle 1, the housing 15 may be unfolded by rotating in a direction that the camera faces the side and rear of the vehicle 1. To this end, the camera monitoring system 10 may include a driving unit (not shown) capable of moving the housing 15.

The vehicle 1 according to the embodiment may acquire a side and rear image of the vehicle 1 through the camera monitoring system 10 to determine whether a user approaches a driver door, i.e., a driver seat door 20. The vehicle 1 may furthermore identify whether the user touches a door handle 25 of the driver seat door 20.

Furthermore, the vehicle 1 according to the embodiments may determine body information (e.g., a height, a hip point, and the like) of the user based on the side and rear image obtained through the camera monitoring system 10. Additionally, the vehicle 1 may adjust the positions of a driver's seat, a steering wheel, and a head up display (HUD) to correspond to the body information.

Hereinafter, an example in which the vehicle 1 determines the user's body information and optimizes the driver's seat based on the user's body information is described below in more detail.

Figure 2:
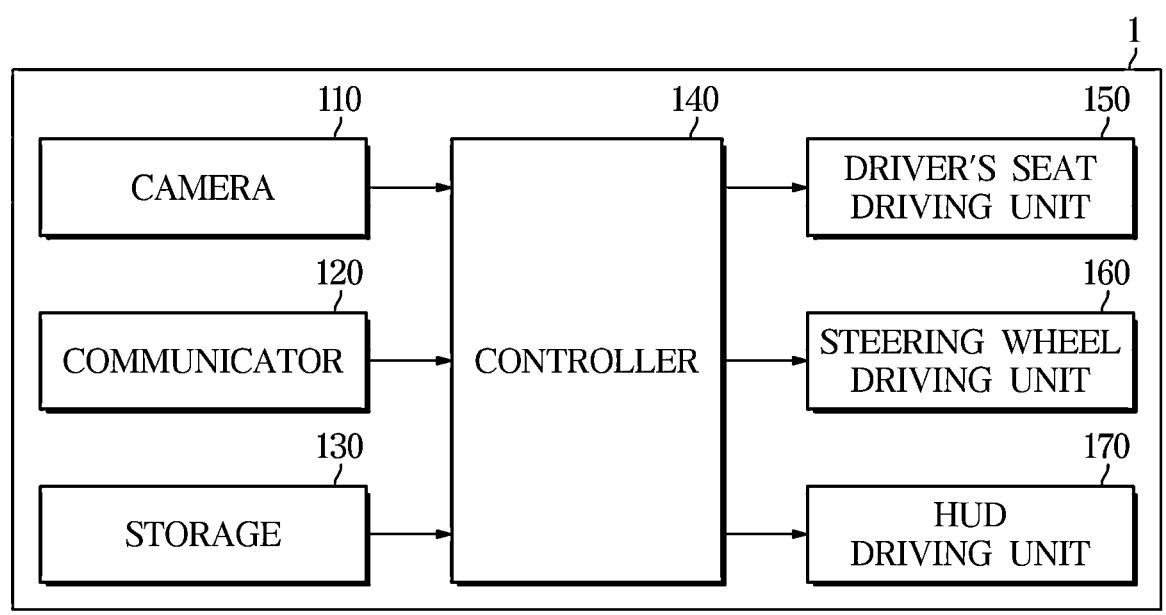
FIG. 2 is a control block diagram of a vehicle according to an embodiment.

FIG. 2 is a control block diagram of a vehicle according to an embodiment.

Referring to FIG. 2, the vehicle 1 according to the embodiment includes a camera 110 that is disposed on the left and right sides of the outside of the vehicle 1 and photographs the side and rear of the vehicle 1 to acquire image data. The vehicle 1 further includes a communicator 120 that communicates with an external electronic device, such as a vehicle key, and a storage 130 that stores various types of information required for control. The vehicle 1 further includes a controller 140 that acquires body information of the driver through image processing on a side and rear image and optimizes the driver's seat based on the driver's body information. In addition, the vehicle 1 includes a driver's seat driving unit 150 for moving the driver's seat, a steering wheel driving unit 160 for moving the steering wheel, and a HUD driving unit 170 for moving a HUD.

However, the components of the vehicle 1 illustrated in FIG. 2 are only an example. Therefore, according to the embodiments, some of the components of the vehicle 1 illustrated in FIG. 2 may be omitted or components that are not illustrated in FIG. 2 may be added.

The camera 110 according to the embodiment is a component of the camera monitoring system 10 and may be provided on the left and right sides of the outside of the vehicle 1. The camera 110 may acquire image data by photographing the side and rear of the vehicle 1. To this end, the camera 110 may be configured as a known type of image sensor.

The communicator 120 according to the embodiment may communicate with an external electronic device, and to this end, may include a known type of communication module. For example, the communicator 120 may receive a signal from a vehicle key. For example, upon determining that the vehicle key has entered an area within a predetermined distance based on a signal received from the vehicle key through the communicator 120, the controller 140 may control the housing 15 of the camera monitoring system 10 to be unfolded and may perform image processing on image data acquired through the camera 110.

The storage 130 according to the embodiment may include various types of information required for control. For example, such control information may include: information about the optimal positions of the driver's seat for each height; information about the optimal positions of the driver's seat for each height and hip point; algorithms or neural networks for image processing; a list of registered drivers; algorithms for determining a user's height; and so on. To this end, the storage 130 may be provided as a known type of storage medium.

The controller 140 according to the embodiment may, in response to a user's touch on the door handle 25 of the driver seat door 20 being identified based on the image processing of the image data obtained through the camera 110, determine the height of the user based on the image processing of the image data and may adjust the position of at least one of the driver's seat, the steering wheel, and the HUD to correspond to the height of the user.

In other words, the controller 140 may control the driver's seat driving unit 150, the steering wheel driving unit 160, and the HUD driving unit 170 to adjust the positions of the driver's seat, the steering wheel, and the HUD, respectively.

In this case, according to the embodiments, the controller 140 may initiate the process of determining the height of the user in response to a user being identified at a point higher than a predetermined child lock reference horizontal line in the image data. Further, the controller 140 may keep a door locked without determining the height of the user in response to a user not being identified at a point higher than the predetermined child lock reference horizontal line in the image data.

The controller 140 may determine a region located at the highest point from the ground among regions in which the user is identified through the image processing on the image data. The controller 140 may also determine the height of the user based on the determined region. In this case, the algorithm for image processing may be a known type of algorithm, for example, an object recognition algorithm.

Specifically, the controller 140 may determine a height dimension based on a horizontal line corresponding to the determined region among a plurality of horizontal lines vertically dividing the image data. The controller 140 may also determine a correction coefficient based on a vertical line corresponding to the determined region among a plurality of vertical lines horizontally dividing the image data. The controller 140 may also determine the height of the user as a product of the height dimension and the correction coefficient.

In this case, the correction coefficient is a coefficient for correcting the geometric distortion of the camera 110 and may decrease as the vertical line becomes more distant or further away in a sideways direction from a predetermined specific region of the image data. For example, the correction coefficient may have a value of 1 for the vertical line of the central region of the image data and may decrease as the vertical line becomes more distant or further away from the central region of the image data in a sideways direction. In other words, the central region of the image data may correspond to a non-correction region that does not require correction. The correction coefficient may decrease as being directed sideways in the image data, so that the correction degree may increase.

The controller 140 may adjust the driver seat to an optimal position corresponding to the height of the user based on information about the optimal position of the driver seat for each height. Specifically, the controller 140 may adjust the position of at least one of the driver's seat, the steering wheel, and the HUD to the optimal position corresponding to the height of the user based on information about the optimal positions of the driver's seat, the steering wheel, and the HUD for each height. Herein, each height specific stored heights and stored data points for each height among a range of stored heights from a shortest stored height to a tallest stored height.

In addition, according to the embodiments, the controller 140 may, upon a presence of a registered driver having the height of the user in the registered driver list, determine that the user is the registered driver. The controller 140 may also adjust the position of at least one of the driver's seat, the steering wheel, or the HUD to a position designated by the registered driver.

In addition, according to the embodiments, the controller 140 may maintain the position of the driver seat as it is in response to an opening of the driver seat door 20 not being detected for a predetermined time after the height of the user is determined. In other words, the controller 140 may maintain the positions of the driver's seat, the steering wheel, and the HUD.

In addition, according to the embodiments, the controller 140 may determine a hip point of the user together with the height of the user based on the image processing of the image data and may adjust the position of the driver seat to correspond to the height and the hip point.

In other words, the controller 140 may adjust the position of the driver seat in further consideration of the user's hip point in addition to the user's height, thereby providing a more optimized driver seat position. In this case, the controller 140 may adjust the driver seat to the position of the driver seat corresponding to the height and hip point of the user using the information about the optimal positions of the driver seat for each height and hip point.

In this case, the hip point indicates the position of the user's hip in the image data. The user's lower body length, upper body length, and the like may be derived from the hip point.

The controller 140 may include at least one memory in which a program for performing the above-described operation and an operation to be described below is stored. The controller 140 may also include at least one processor for executing the stored program. When there is a plurality of memories and processors, the plurality of memories and processors may be integrated on one chip or may be provided in physically separate locations.

The driver's seat driving unit 150 according to the embodiment may move the position of the driver's seat under the control of the controller 140. To this end, the driver's seat driving unit 150 may be provided as a known type of actuator.

The steering wheel driving unit 160 according to the embodiment may move the position of the steering wheel under the control of the controller 140. To this end, the steering wheel driving unit 160 may be provided as a known type of actuator.

The HUD driving unit 170 according to the embodiment may move the position of the HUD under the control of the controller 140. Specifically, the HUD driving unit 170 may adjust the irradiation direction of the HUD such that the position of a region in which the HUD is displayed is moved. To this end, the HUD driving unit 170 may be provided as a known type of actuator.

Figure 3:
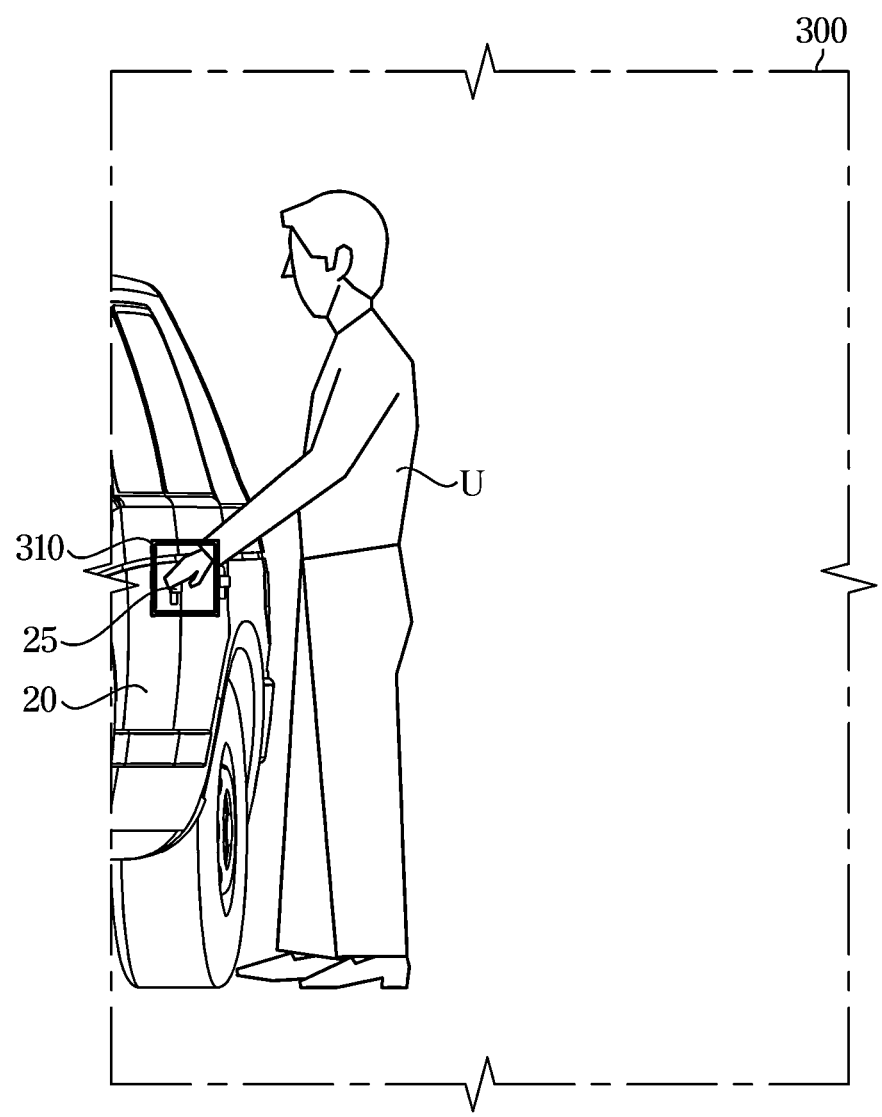
FIG. 3 is a diagram illustrating that a vehicle identifies a user's touch on a door handle according to an embodiment.

FIG. 3 is a diagram illustrating that a vehicle 1 identifies a user's touch on a door handle 25 according to an embodiment.

Referring to FIG. 3, the vehicle 1 according to the embodiment may identify a touch of a user U on the door handle 25 of the driver seat door 20 based on image processing of image data 300 acquired through the camera 110.

Specifically, the controller 140 may identify a touch of the user U on the door handle 25 of the driver seat door 20 based on image processing of a region 310 of the image data 300 in which the door handle 25 is identified.

The vehicle 1 according to the embodiment may, upon a touch of the user U on the door handle 25 of the driver seat door 20 being identified based on image processing of the image data 300 acquired through the camera 110, determine the height of the user U based on the image processing of the image data 300. The vehicle 1 may also adjust the position of the driver seat to correspond to the height of the user U.

Figure 4:
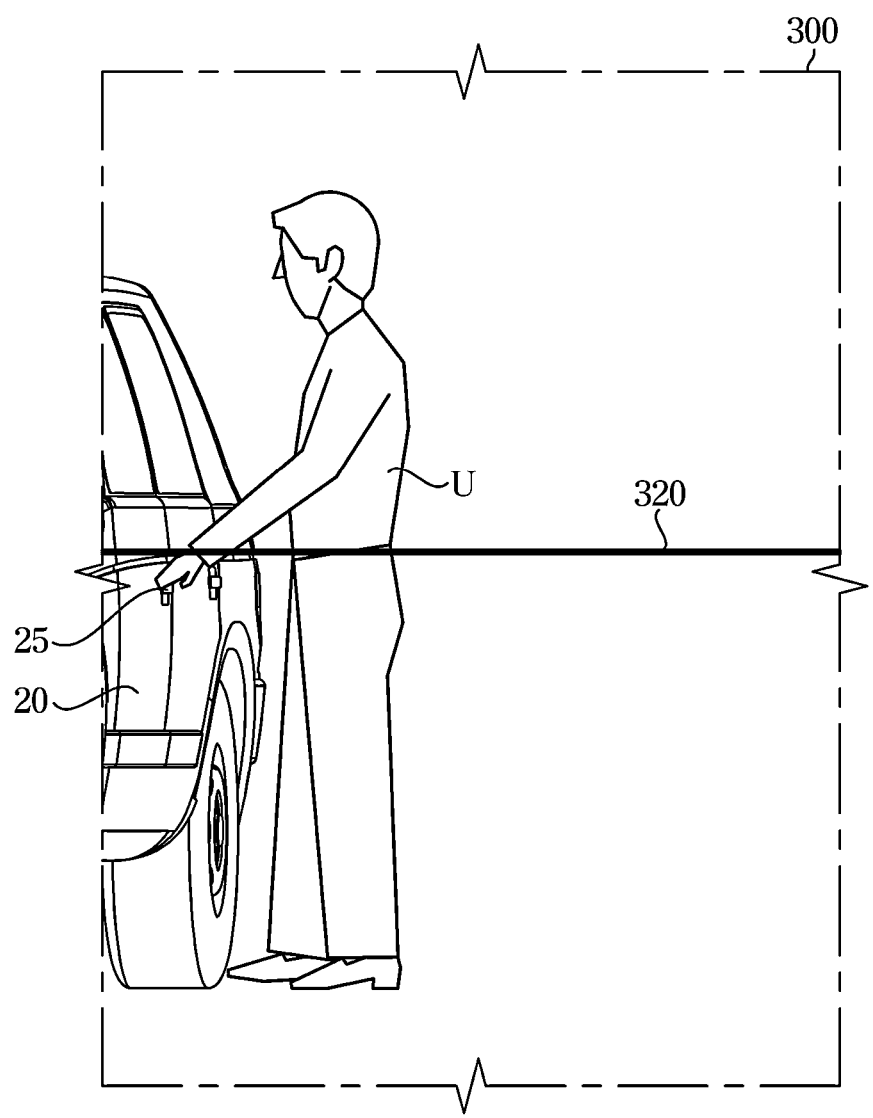
FIG. 4 is a view illustrating a child lock reference horizontal line of a vehicle according to an embodiment.

FIG. 4 is a view illustrating a predetermined child lock reference horizontal line of a vehicle 1 according to an embodiment.

Referring to FIG. 4, the controller 140 according to the embodiment may, in response to a user U being identified at a point higher than a predetermined child lock reference horizontal line 320 in the image data 300, initiate a process of determining the height of the user U. Further, in response to a user U not being identified at a point higher than the predetermined child lock reference horizontal line 320 in the image data 300, keep a door locked without determining the height of the user U.

In other words, the vehicle 1 may predetermine the child lock reference horizontal line 320 as a reference line for discriminating whether the user U is an adult in the image data. For example, the child lock reference horizontal line 320 may be positioned at a height corresponding to the height of the door handle 25 in the image data, as shown in FIG. 4.

Figure 5:
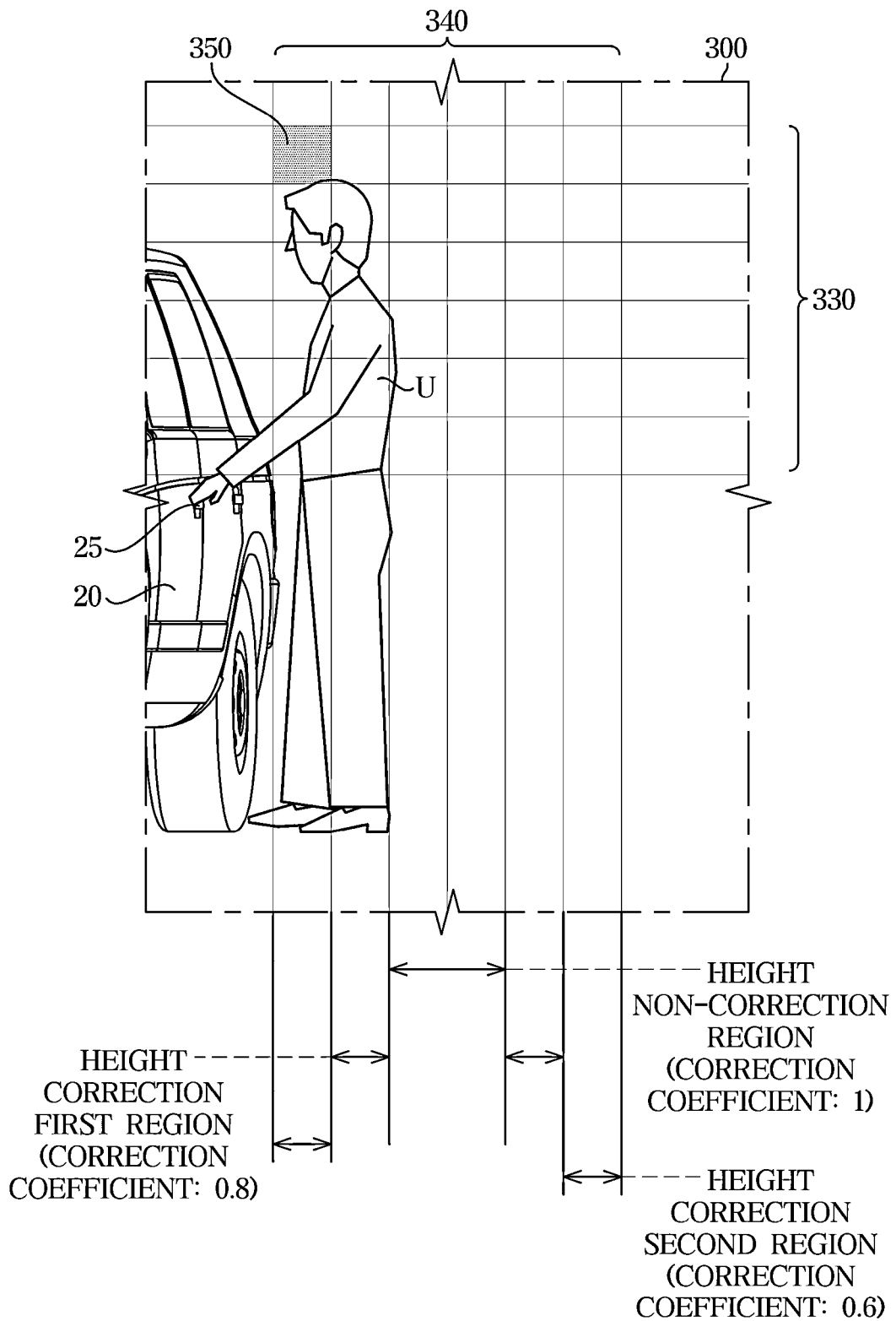
FIG. 5 is a diagram illustrating that a vehicle determines the height of a user according to an embodiment.

FIG. 5 is a diagram illustrating that a vehicle 1 determines the height of a user according to an embodiment.

Referring to FIG. 5, the vehicle 1 may determine a region 350 located at the highest point from the ground among regions in which the user U is identified through the image processing on the image data 300. The vehicle 1 may determine the height of the user U based on the determined region 350. In this case, the algorithm for image processing may be a known type of algorithm, for example, an object recognition algorithm.

Specifically, the vehicle 1 may determine a height dimension based on a horizontal line corresponding to the determined region 350 among a plurality of horizontal lines 330 vertically dividing the image data 300. Further, the vehicle 1 may determine a correction coefficient based on a vertical line corresponding to the determined region 350 among a plurality of vertical lines 340 horizontally dividing the image data 300. Additionally, the vehicle 1 may determine the height of the user U as a product of the height dimension and the correction coefficient.

In this case, the correction coefficient is a coefficient for correcting the geometric distortion of the camera 110 and may decrease as the vertical line becomes more distant or further away from a predetermined specific region of the image data in a sideways direction. For example, the correction coefficient may have a value of 1 for the vertical line of the central region of the image data 300 and may decrease as the vertical line becomes more distant or further away from the central region of the image data 300 in a sideways direction. In other words, the central region of the image data 300 may correspond to a non-correction region that does not require correction. The correction coefficient may decrease as being directed sideways in the image data 300, so the correction degree may increase.

In other words, the vehicle 1 may determine a height dimension and a correction coefficient corresponding to the horizontal line and the vertical line in the region having the highest position among the regions in which the user U is identified. The vehicle 1 multiplies the height dimension and the correction coefficient to determine the height of the user U.

In this case, the vehicle 1 may store information about heights (height dimensions) from the ground corresponding to the plurality of horizontal lines 330, respectively, and may store information about correction coefficients corresponding to the plurality of vertical lines 340, respectively.

FIG. 6 is a diagram illustrating that a vehicle 1 adjusts the position of a driver seat to correspond to the height of a user U in the vehicle 1 according to an embodiment.

Referring to FIG. 6, the vehicle 1 according to the embodiment may adjust the driver seat to an optimal position corresponding to the height of the user U based on information about the optimal position of the driver seat for each height.

Specifically, the controller 140 may adjust the position of at least one of the driver's seat, the steering wheel, and the HUD to the optimal position corresponding to the height of the user U based on information about the optimal positions of the driver's seat, the steering wheel, and the HUD for each height.

For example, as shown in FIG. 6, the controller 140 may determine the position of the driver seat corresponding to the determined height of the user U in the information about the optimal positions of the driver seat for each height. The controller 140, based on the determined position of the driver seat, may also adjust the position of at least one of the driver's seat, the steering wheel, and the HUD.

However, according to the embodiments, the vehicle 1 may, upon a presence of a registered driver having the height of the user U in the registered driver list, determine that the user U is the registered driver. The vehicle 1 may also adjust the position of at least one of the driver's seat, the steering wheel, or the HUD to a position designated by the registered driver.

In addition, according to the embodiments, the vehicle 1 may maintain the position of the driver seat as it is in response to an opening of the driver seat door 20 not being detected for a predetermined time after the height of the user U is determined. In other words, the controller 140 may maintain the positions of the driver's seat, the steering wheel, and the HUD.

Figure 7:
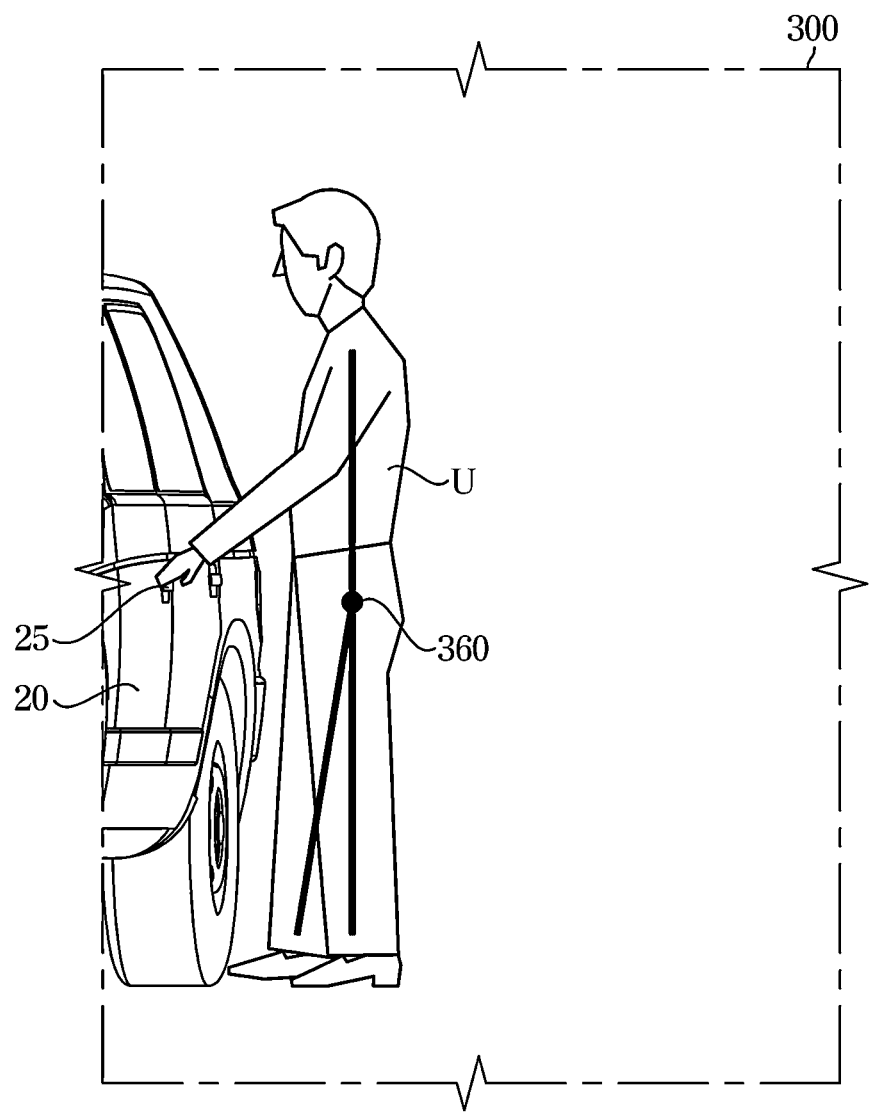
FIG. 7 is a diagram illustrating that a vehicle determines a hip point of a user according to an embodiment.

FIG. 7 is a diagram illustrating that a vehicle 1 determines a hip point of a user according to an embodiment.

Referring to FIG. 7, the vehicle 1 may determine a hip point 360 of the user U together with the height of the user U based on the image processing of the image data 300 and may adjust the position of the driver seat to correspond to the height and the hip point 360 of the User U.

In other words, the controller 140 may adjust the position of the driver seat in further consideration of the hip point 360 of the user in addition to the height of the user U, thereby providing a more optimized driver seat position. In this case, the controller 140 may adjust the driver seat to the position of the driver seat corresponding to the height and hip point of the user using the information about the optimal positions of the driver seat for each height and hip point.

In this case, the hip point 360 indicates the position of the hip of the user U in the image data 300. The user's lower body length, upper body length, and the like may be derived from the hip point 360.

Hereinafter, an embodiment of a method of controlling the vehicle 1, according to an aspect, is described. The vehicle 1 according to the above-described embodiments may be used for the method of controlling the vehicle 1. Accordingly, the above description made with reference to FIGS. 1-7 may be equally applied to the method of controlling the vehicle 1.

Figure 8:
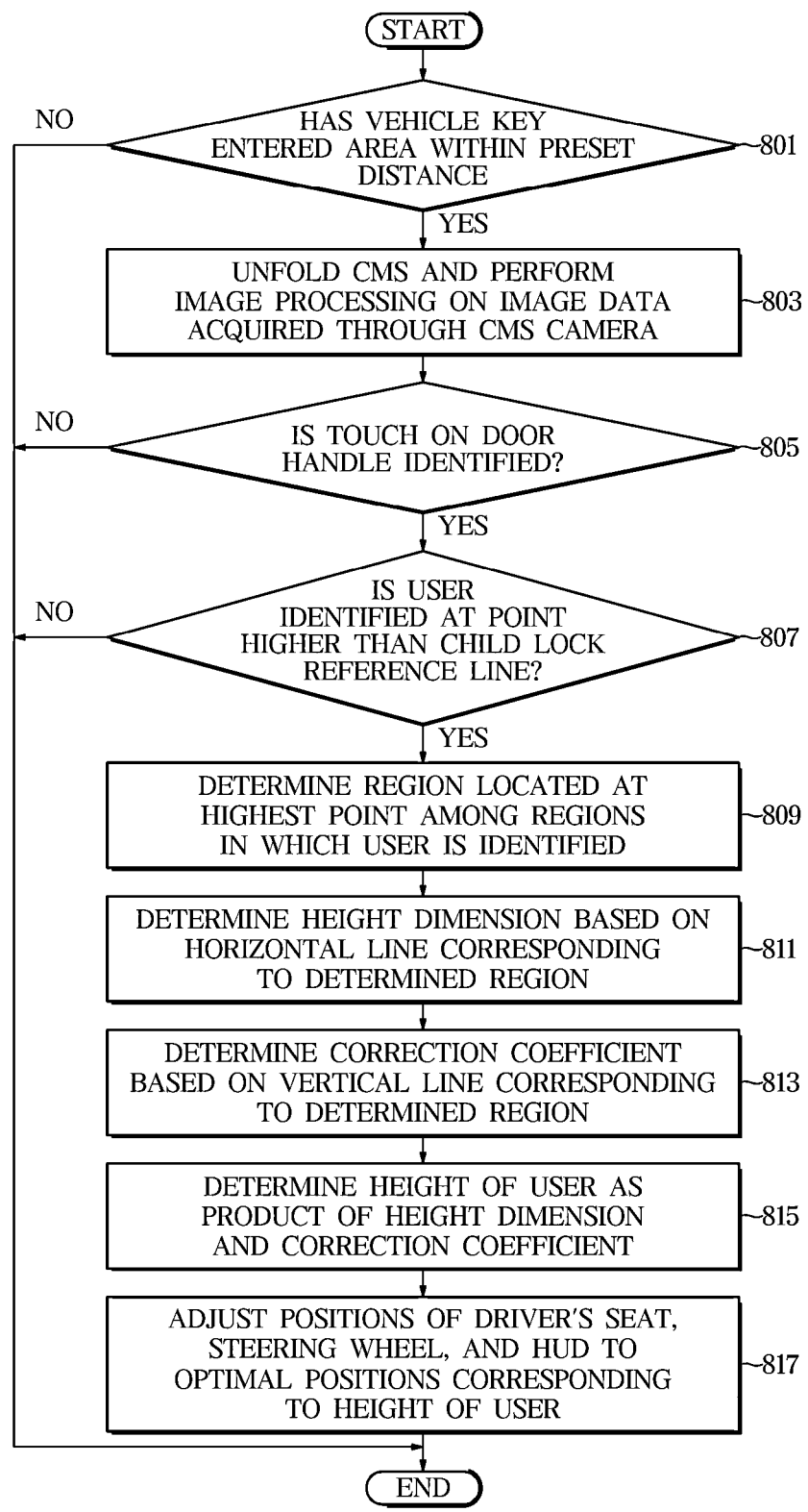
FIG. 8 is a flowchart of a method of controlling a vehicle according to an embodiment, showing that the position of a driver seat is adjusted by determining the height of a user.

FIG. 8 is a flowchart of a method of controlling a vehicle 1 according to an embodiment, showing that the position of a driver seat is adjusted by determining the height of a user U.

Referring to FIG. 8, the vehicle 1 according to the embodiment may, upon a vehicle key entering an area within a predetermined distance from the vehicle 1 (YES in operation 801), unfold the housing 15 of the camera monitoring system 10. The vehicle may then perform image processing on image data acquired through the camera 110 of the camera monitoring system 10 (803).

The vehicle 1 according to the embodiment may identify a touch on the door handle 25 based on the image processing of the image data (YES in operation 805). Additionally, upon a user U being identified at a point higher than the child lock reference line 320 (YES in operation 807), the vehicle 1 may determine a region 350 located at the highest point among regions in which the user U is identified (809).

The vehicle 1 may determine a height dimension based on a horizontal line corresponding to the determined region 350 among the plurality of horizontal lines 330 vertically dividing the image data (811). The vehicle 1 may determine a correction coefficient based on a vertical line corresponding to the determined region among a plurality of vertical lines 340 horizontally dividing the image data (813). Additionally, the vehicle 1 may determine the height of the user U as a product of the height dimension and the correction coefficient (815).

In this case, the correction coefficient is a coefficient for correcting the geometric distortion of the camera 110 and may decrease as the vertical line becomes more distant or further away from a predetermined specific region of the image data in a sideways direction. For example, the correction coefficient may have a value of 1 for the vertical line of the central region of the image data and may decrease as the vertical line becomes more distant or further away from the central region of the image data in a sideways direction. In other words, the central region of the image data may correspond to a non-correction region that does not require correction. The correction coefficient may decrease as being directed sideways in the image data, so that the correction degree may increase.

In other words, the vehicle 1 may determine the height dimension and the correction coefficient corresponding to the horizontal line and the vertical line in the region having the highest position among the regions in which the user U is identified. The vehicle 1 may further multiply the height dimension and the correction coefficient to determine the height of the user U.

In this case, the vehicle 1 may store information about heights (height dimensions) from the ground corresponding to the plurality of horizontal lines 330, respectively. The vehicle 1 may also store information about correction coefficients corresponding to the plurality of vertical lines 340, respectively.

The vehicle 1 according to the embodiment may adjust the positions of the driver's seat, the steering wheel, and the HUD to optimal positions corresponding to the height of the user U (817).

Specifically, the controller 140 may adjust the position of at least one of the driver's seat, the steering wheel, and the HUD to the optimal position corresponding to the height of the user U based on information about the optimal positions of the driver's seat, the steering wheel, and the HUD for each height.

For example, the controller 140 may determine the position of the driver seat corresponding to the determined height of the user U in the information about the optimal positions of the driver seat for each height. The controller 140 may adjust the position of at least one of the driver's seat, the steering wheel, and the HUD, based on the determined position of the driver seat.

Figure 9:
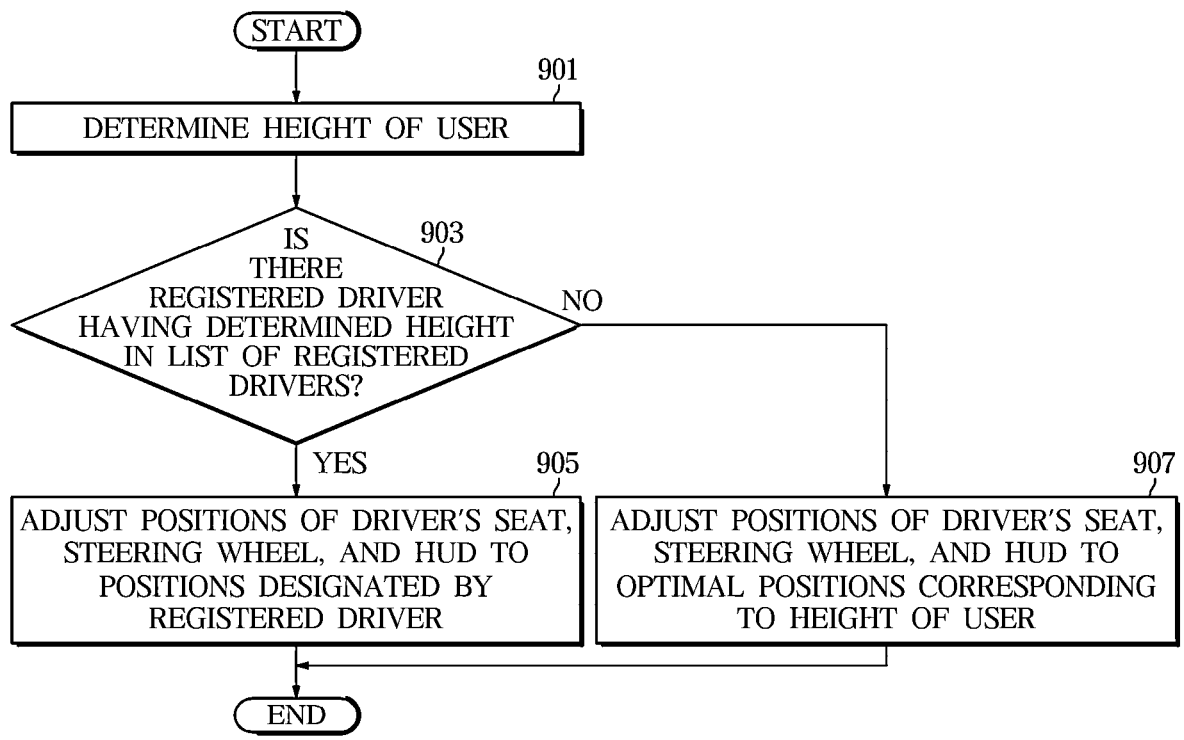
FIG. 9 is a flowchart of a method of controlling a vehicle according to an embodiment, showing that the position of a driver seat is adjusted to a position designated by a registered driver.

FIG. 9 is a flowchart of a method of controlling a vehicle 1 according to an embodiment, showing that the position of a driver seat is adjusted to a position designated by a registered driver.

Referring to FIG. 9, the vehicle 1 according to the embodiment may determine the height of the user (901). Further, the vehicle 1, upon a presence of a registered driver having the determined height in the list of registered drivers (YES in operation 903), may adjust the positions of the driver's seat, the steering wheel, and the HUD to the positions designated by the registered driver (905).

Further, the vehicle 1 according to the embodiment may, upon an absence of a registered driver having the determined height in the list of registered drivers (NO in operation 903), adjust the positions of the driver's seat, the steering wheel, and the HUD to the optimal positions corresponding to the height of the user U (907).

In other words, according to the embodiment, the vehicle 1 may, upon a presence of a registered driver having the height of the user U in the list of registered drivers, determine that the user U is the registered driver and adjust the position of at least one of the driver's seat, the steering wheel and the HUD to the position designated by the registered driver.

Figure 10:
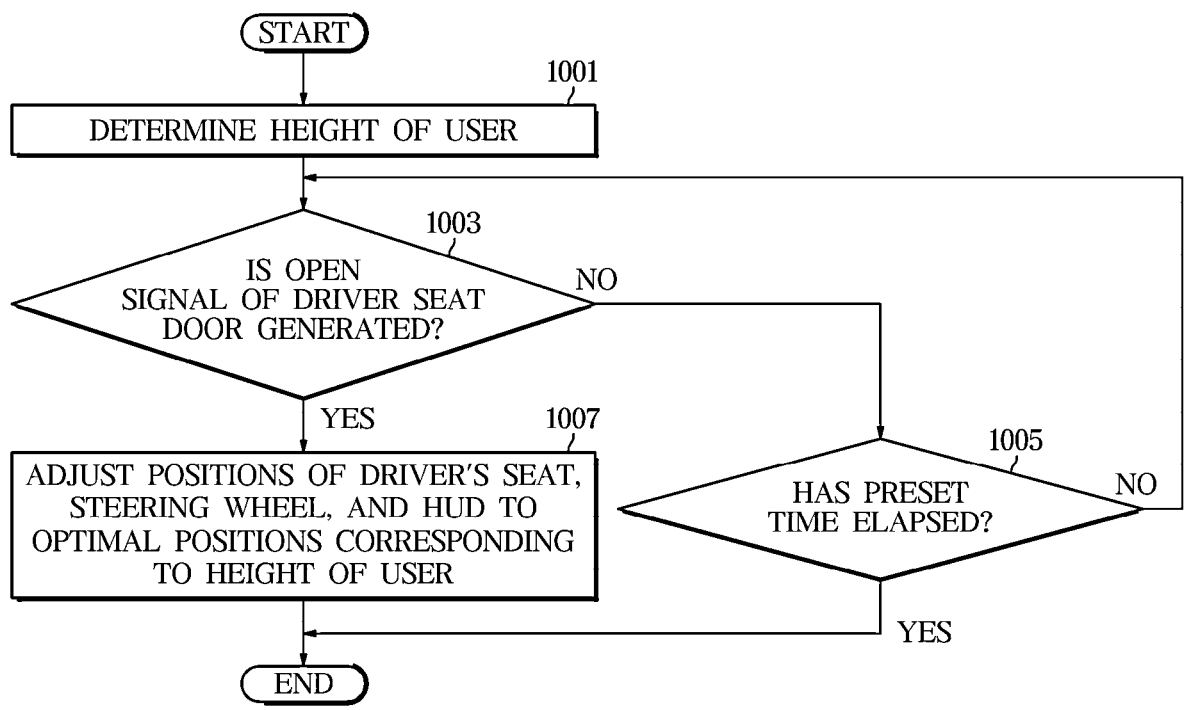
FIG. 10 is a flowchart of a method of controlling a vehicle according to an embodiment, showing that the position of a driver seat is adjusted based on generation of an open signal of a driver seat door.

FIG. 10 is a flowchart of a method of controlling a vehicle 1 according to an embodiment, showing that the position of a driver seat is adjusted based on the generation of a door open signal of a driver seat door.

Referring to FIG. 10, the vehicle 1 according to the embodiment may determine the height of the user (1001) and, when an open signal of a driver seat door is generated (YES in 1003), adjust the positions of the driver's seat, steering wheel, and HUD to the optimal positions corresponding to the height of the user U (1007).

However, the vehicle 1 according to the embodiment may terminate the procedure without adjusting the position of the driver seat upon an open signal of a driver seat door not being generated (NO in 1003) and elapse of a predetermined time (1005) since the determining of the height of the user (1001).

In other words, according to the embodiment, the vehicle 1 may maintain the position of the driver seat when an opening of the driver seat door 20 is not detected for a predetermined time after the determining of the height of the user U. In other words, the controller 140 may maintain the positions of the driver's seat, the steering wheel, and the HUD, respectively.

Figure 11:
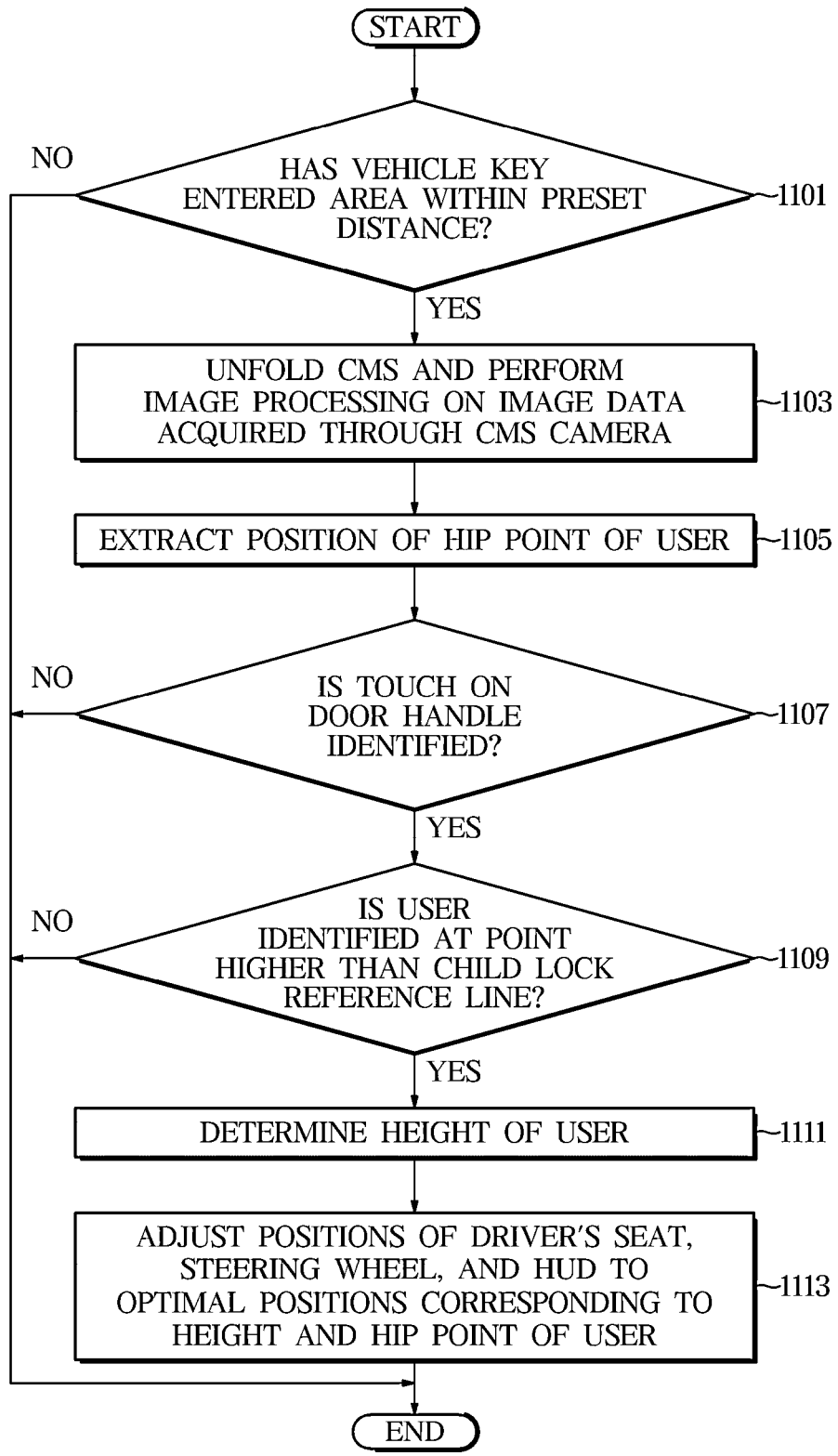
FIG. 11 is a flowchart of a method of controlling a vehicle according to an embodiment, showing that the position of a driver seat is adjusted by determining a user's height and hip point.

FIG. 11 is a flowchart of a method of controlling a vehicle 1 according to an embodiment, showing that the position of a driver seat is adjusted by determining a user's height and hip point.

Referring to FIG. 11, the vehicle 1 according to the embodiment may, upon a vehicle key entering an area within a predetermined distance from the vehicle 1 (YES in operation 1101), unfold the housing 15 of the camera monitoring system 10. The vehicle 1 may also perform image processing on image data acquired through the camera 110 of the camera monitoring system 10 (1103).

In this case, the vehicle 1 may extract the position of the hip point 360 of the user U based on the image processing of the image data (1105).

The vehicle 1 according to the embodiment may determine the height of the user U (1111) upon a touch on the door handle 25 being identified based on the image processing of the image data (YES in operation 1107) and a user U being identified at a point higher than the child lock reference line 320 (YES in operation 1109).

The vehicle 1 according to the embodiment may adjust the positions of the driver's seat, the steering wheel, and the HUD to the optimal positions corresponding to the height and the hip point 360 of the user U (1113).

In other words, the controller 140 may adjust the position of the driver seat in further consideration of the user's hip point 360 in addition to the user's height, thereby providing a more optimized driver seat position. In this case, the controller 140 may adjust the driver seat to the position of the driver seat corresponding to the height and the hip point 360 of the user using the information about the optimal positions of the driver seat for each height and hip point.

In this case, the hip point 360 indicates the position of the hip of the user U in the image data. The user's lower body length, upper body length, and the like may be derived from the hip point 360.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions that may be decoded by a computer are stored. For example, the recording media may include a Read Only Memory (ROM), a Random Access Memory (RAM), a magnetic tape, a magnetic disk, a flash memory, an optical data storage device, and the like.

As should be apparent from the above, the vehicle and the method of controlling the same according to one aspect are implemented to acquire body information of a driver through a camera of a camera monitoring system (CMS) before the driver boards the vehicle. Further, the vehicle and the method of controlling the same according to another aspect are implemented to adjust the positions of a driver's seat, a steering wheel, and a head up display (HUD) to correspond to the driver's body information. Thus, an optimized driver's seat can be automatically provided to thereby enhance the driver's convenience and secure the driver's safety.

Although embodiments of the present disclosure have been described for illustrative purposes, those having ordinary skill in the art should appreciate that various modifications, additions, and substitutions are possible, without departing from the scope and spirit of the disclosure. Therefore, embodiments of the present disclosure have not been described for limiting purposes.

What is claimed is:

1. A vehicle comprising:
   a camera disposed on a left side and a right side of an exterior of the vehicle and configured to acquire image data by photographing a surrounding area of the vehicle; and
   a controller configured to, upon a touch of a user on a door handle of a driver door being identified based on image processing on the image data, determine a height of the user based on the image processing on the image data and adjust positions of a driver's seat, a steering wheel, and a head up display (HUD) to correspond to the determined height of the user.

2. The vehicle of claim 1, wherein the controller is configured to
   determine the height of the user upon the user being identified at a point higher than a predetermined child lock reference horizontal line in the image data and
   to keep a door locked upon the user not being identified at the point higher than the predetermined child lock reference horizontal line in the image data.

3. The vehicle of claim 1, wherein the controller is configured to
   determine a region located at a highest position from a ground among regions in which the user is identified in the image data and
   determine the height of the user based on the determined region.

4. The vehicle of claim 3, wherein the controller is configured to
   determine a height dimension based on a horizontal line corresponding to the determined region among a plurality of horizontal lines dividing the image data vertically,
   determine a correction factor based on a vertical line corresponding to the determined region among a plurality of vertical lines dividing the image data horizontally, and
   determine the height of the user as a product of the height dimension and the correction factor.

5. The vehicle of claim 4, wherein the correction factor decreases as the vertical line becomes more distant from a predetermined specific region in the image data sideways.

6. The vehicle of claim 1, wherein the controller is configured to adjust the positions of the driver's seat, the steering wheel, and the HUD to optimal positions corresponding to the height of the user based on information about optimal positions of the driver's seat, the steering wheel, and the HUD for each height.

7. The vehicle of claim 1, wherein the controller is configured to, upon a presence of a registered driver having the height of the user in a registered driver list, adjust the positions of the driver's seat, the steering wheel, and the HUD to positions designated by the registered driver.

8. The vehicle of claim 1, wherein the controller is configured to maintain the positions of the driver's seat, the steering wheel, and the HUD upon an opening of the driver door not being detected for a predetermined time after the height of the user is determined.

9. The vehicle of claim 1, wherein the controller is configured to
   determine a hip point of the user together with the height of the user based on the image processing on the image data, and
   adjust the positions of the driver's seat, the steering wheel, and the HUD to correspond to the height and the hip point.

10. A method of controlling a vehicle including a camera disposed on a left side and a right side of an exterior of the vehicle and configured to acquire image data by photographing a surrounding area of the vehicle, the method comprising:
    upon a touch of a user on a door handle of a driver door being identified based on image processing on the image data, determining a height of the user based on the image processing on the image data; and
    adjusting positions of a driver's seat, a steering wheel, and a head up display (HUD) to correspond to the determined height of the user.

11. The method of claim 10, further comprising:
    determining the height of the user upon the user being identified at a point higher than a predetermined child lock reference horizontal line in the image data; and
    keeping a door locked upon the user not being identified at the point higher than the predetermined child lock reference horizontal line in the image data.

12. The method of claim 10, wherein the determining of the height of the user includes:
    determining a region located at a highest position from a ground among regions in which the user is identified in the image data; and
    determining the height of the user based on the determined region.

13. The method of claim 12, wherein the determining of the height of the user comprises:
    determining a height dimension based on a horizontal line corresponding to the determined region among a plurality of horizontal lines dividing the image data vertically;
    determining a correction factor based on a vertical line corresponding to the determined region among a plurality of vertical lines dividing the image data horizontally; and
    determining the height of the user as a product of the height dimension and the correction factor.

14. The method of claim 13, wherein the correction factor decreases as the vertical line becomes more distant from a predetermined specific region in the image data sideways.

15. The method of claim 10, wherein the adjusting of the positions of the driver's seat, the steering wheel, and the HUD to correspond to the height of the user comprises:

adjusting the positions of the driver's seat, the steering wheel, and the HUD to optimal positions corresponding to the height of the user based on information about optimal positions of the driver's seat, the steering wheel, and the HUD for each height.

16. The method of claim 10, wherein the adjusting of the positions of the driver's seat, the steering wheel, and the HUD to correspond to the height of the user comprises: upon a presence of a registered driver having the height of the user in a registered driver list, adjusting the positions of the driver's seat, the steering wheel, and the HUD to positions designated by the registered driver.

17. The method of claim 10, wherein the adjusting of the positions of the driver's seat, the steering wheel, and the HUD to correspond to the height of the user comprises: maintaining the positions of the driver's seat, the steering wheel, and the HUD upon an opening of the driver door not being detected for a predetermined time after the height of the user is determined.

18. The method of claim 10, wherein the adjusting of the positions of the driver's seat, the steering wheel, and the HUD to correspond to the height of the user comprises:
determining a hip point of the user together with the height of the user based on the image processing on the image data; and
adjusting the positions of the driver's seat, the steering wheel, and the HUD to correspond to the height and the hip point.

* * * * *